(12) United States Patent
Nichols et al.

(10) Patent No.: US 7,414,706 B2
(45) Date of Patent: Aug. 19, 2008

(54) METHOD AND APPARATUS FOR IMAGING A TARGET USING CLOUD OBSCURATION PREDICTION AND DETECTION

(75) Inventors: William Mark Nichols, San Diego, CA (US); Randolph Gregory Farmer, Rancho Palos Verdes, CA (US); Gerard Michael LaColla, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/021,450

(22) Filed: Dec. 22, 2004

(65) Prior Publication Data

US 2006/0132753 A1 Jun. 22, 2006

(51) Int. Cl.
*G01C 3/08* (2006.01)
(52) U.S. Cl. ............... 356/5.07; 356/4.01; 356/28; 382/103; 382/107
(58) Field of Classification Search ........... 356/4.01, 356/5.07, 28; 382/103, 107
See application file for complete search history.

(56) References Cited

U.S. PATENT DOCUMENTS

| | | | | |
|---|---|---|---|---|
| 3,963,347 | A | | 6/1976 | Segre et al. |
| 5,556,029 | A | * | 9/1996 | Griese ............ 239/2.1 |
| 5,602,543 | A | | 2/1997 | Prata et al. |
| 5,974,360 | A | | 10/1999 | Otsuka et al. |
| 6,133,990 | A | * | 10/2000 | Miller et al. ............ 356/4.01 |
| 6,581,009 | B1 | | 6/2003 | Smith |
| 6,650,402 | B2 | | 11/2003 | Sullivan et al. |
| 6,847,462 | B1 | * | 1/2005 | Kacyra et al. ............ 356/601 |
| 7,016,784 | B2 | * | 3/2006 | Allen et al. ............ 702/3 |
| 2001/0043323 | A1 | | 11/2001 | Sullivan et al. |
| 2002/0096622 | A1 | | 7/2002 | Adler-Golden et al. |
| 2003/0065445 | A1 | * | 4/2003 | White et al. ............ 702/2 |
| 2005/0051713 | A1 | * | 3/2005 | Halmos ............ 250/227.11 |

FOREIGN PATENT DOCUMENTS

WO   WO 00/28279 A1   5/2000

OTHER PUBLICATIONS

D.M. Stuart, Sensor Design for Unmanned Aerial Vehicles, IEEE, vol. 3, Feb. 1, 1997, pp. 285-295.*
D. M. Stuart, "Sensor Design for Unmanned Aerial Vehicles", IEEE, vol. 3, Feb. 1, 1997, pp. 285-295.*
Anonymous, "Recce Forecast for DMZ, DPRK", Website of Federation of American Scientists, Jun. 9, 2004, 2 pgs.*
J. M. Borky, "Payload Technologies and Applications for Uninhabited Air Vehicles (UAVs)", IEEE, vol. 3, Feb. 1, 1997, pp. 267-283.

(Continued)

*Primary Examiner*—Thomas H. Tarcza
*Assistant Examiner*—Timothy A Brainard
(74) *Attorney, Agent, or Firm*—Robert P. Lenart, Esq.; Pietragallo Gordon Alfano Bosick & Raspanti, LLP (57) ABSTRACT

A method is provided for imaging targets using an unmanned air vehicle. The method comprises the steps of making a determination of cloud obscuration of a target, selecting an imaging sensor based on the cloud obscuration determination, and using the selected imaging sensor to produce an image of the target. An apparatus that performs the method is also provided.

11 Claims, 9 Drawing Sheets

OTHER PUBLICATIONS

Patent Abstracts of Japan, JP 2001 122199A (Mitsubishi Electric Corp.), May 8, 2001.

S. P. Palm et al., "An Overview of the GLAS Real-time Atmospheric Processing Algorithms and Results from the Analysis of Simulated GLAS Data Sets", IEEE, vol. 3, Jun. 24, 2002, pp. 1376-1378.

X. Song et al., "Cloud Detection and Analysis of MODIS Image", IEEE, Sep. 20, 2004, pp. 2764-2767.

S. Talabac et al., "Application of Real Time Dynamic Sensor Web Measurement Techniques to Maximiz Aura/TES Useful Science Return", IEEE, vol. 3, Sep. 20, 2004, pp. 2186-2189.

* cited by examiner

METHOD AND APPARATUS FOR IMAGING A TARGET USING CLOUD OBSCURATION PREDICTION AND DETECTION

FIELD OF THE INVENTION

The invention relates to surveillance systems, and more particularly to airborne surveillance systems that can provide images of a target.

BACKGROUND OF THE INVENTION

There is an increased emphasis on the use of unmanned air vehicles (UAVs) for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

Airborne surveillance systems typically include one or more unmanned aircraft each carrying one or more sensors for detecting, imaging or monitoring target items in an area under surveillance. Electro-optical or infrared (EO/IR) sensors can provide high resolution images. However, if clouds obscure the target, EO/IR sensors will not be able to image the target. Synthetic aperture radar (SAR) sensors can penetrate clouds but provide lower resolution images.

The communications devices used in the surveillance system may be bandwidth limited. That is, there may not be enough bandwidth to download imagery from all the sensors at the same time. In addition, electro-optical and infrared cameras may share the same set of lenses to reduce payload weight. In that case, only one EO or IR sensor may be used at a time. Even if all sensors could be used concurrently, there may be limited staff on the ground to evaluate the images; so all downloaded imagery should be the highest quality possible.

If the unmanned aircraft could automatically detect the presence of clouds, the type of sensor that is most appropriate for imaging could be selected. Thus there is a need for a method and apparatus for automatically detecting the presence of clouds from an unmanned aircraft.

SUMMARY OF THE INVENTION

This invention provides a method of imaging targets using an unmanned air vehicle. The method comprises the steps of making a determination of cloud obscuration of a target, selecting an imaging sensor based on the cloud obscuration determination, and using the selected imaging sensor to produce an image of the target.

In another aspect, the invention provides an apparatus for imaging targets from an air vehicle. The apparatus comprises a sensing system for determining cloud obscuration of a target, at least two different imaging sensors, and a controller for selecting one of the imaging sensors for imaging the target, based on the determined cloud obscuration.

DETAILED DESCRIPTION OF THE INVENTION

This invention provides a method and apparatus for Cloud Obscuration Prediction and Detection (COPD) that can predict the probability of obscuration along a line of sight (LOS) from a sensor to a target due to forecast precipitation and/or can detect cloud obscuration in real time using either visual cloud edge detection, laser beam reflection, or the offset of a laser observed by a video sensor. COPD is designed for use in autonomous, unmanned aircraft having limited available bandwidth for transmitting reconnaissance imagery to a user. COPD reduces the capture of imagery obscured by clouds and the subsequent transmission of the obscured imagery. COPD can assist in selecting the best sensor to use based on a forecast for precipitation, a reflected laser, and/or by analysis of video imagery onboard the air vehicle. The system can also be applied to reconnaissance systems that can image with multiple sensors but only transmit the imagery best suited for the obscuring conditions.

This invention is particularly applicable to a surveillance system that includes an unmanned reconnaissance aircraft including a plurality of sensors for gathering information about an area under surveillance. One or more ground stations can be provided to communicate with the aircraft.

A computer or processor can be used to control the operation of the sensors. The processor makes a determination of cloud obscuration of a target or an area to be imaged. The determination of cloud obscuration can be based on a probability of cloud obscuration along a line of sight (LOS) between a sensor and a target before the aircraft is in range of the target and/or a measurement that provides information about cloud obscuration along the LOS between the sensor and the target when the aircraft is in range of the target. The determination of cloud obscuration is used to select the type of sensor to be used to image the target.

Figure 1:
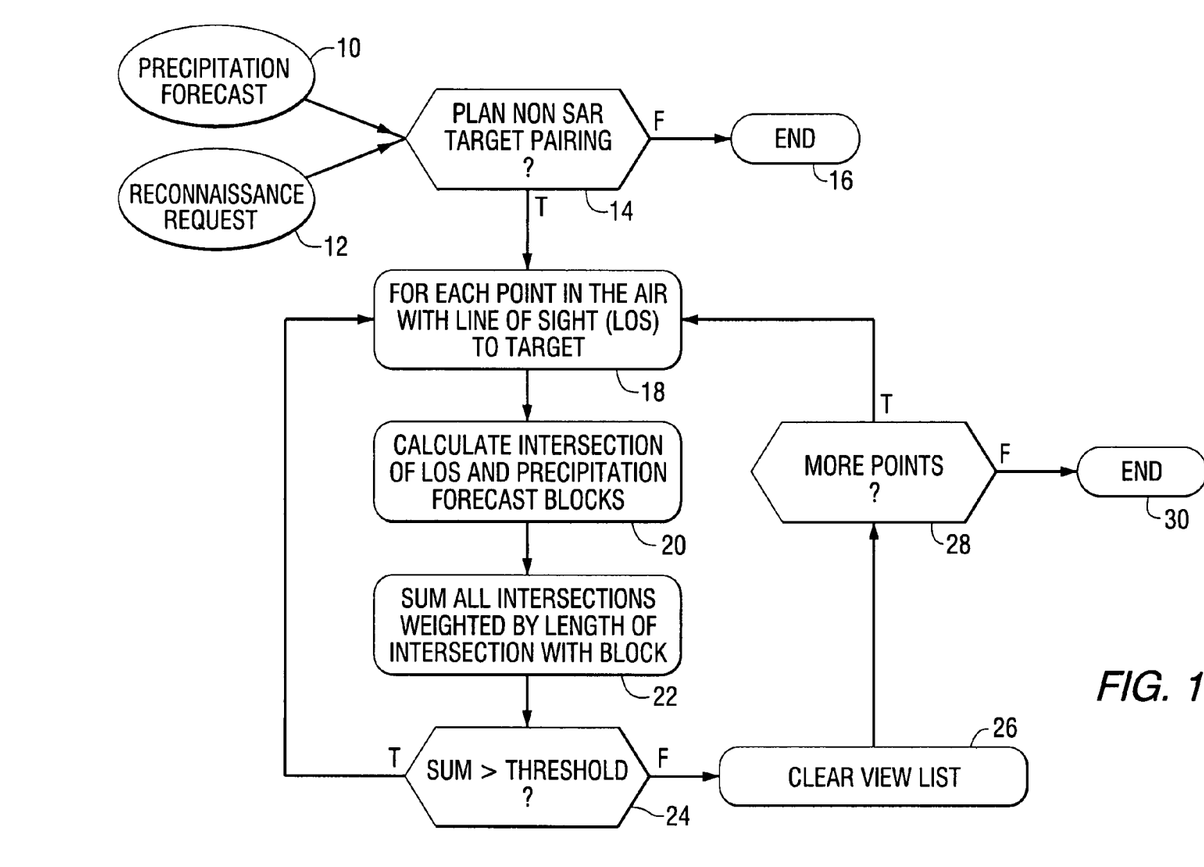
FIG. 1 is a flow diagram of cloud obscuration prediction using forecast data.

Referring to the drawings, FIG. 1 is a flow diagram of cloud obscuration prediction using forecast data. In the method illustrated in FIG. 1, an air vehicle receives a precipitation forecast 10 and a reconnaissance request 12. Typically when an image request is received, the requested image is specified by an image interpretability rating, based on the National Imagery Interpretation Rating Scale (NIIRS). While SAR can see through most atmospheric conditions, it does not produce a very clear image and thus has a low NIIRS. Therefore, EO/IR sensors are used whenever possible as they have a higher NIIRS. EO imagery uses the visible and near visible light bands. IR uses the infrared bands. IR is useful during nighttime when EO is not effective. Depending on the cloud prediction, time of day, and the preference of the request, an image sensor will be paired up with the target to be imaged, as illustrated in block 14. The precipitation forecast includes a probability of precipitation for each of a plurality of blocks of the atmosphere above a target area. Such precipitation forecasts are available from existing sources of weather information like NOAA (Civil), METCAST (Navy), and AFWA (Air Force).

If a pairing cannot be established, the process ends 16. If a pairing is found, precipitation forecast blocks that lie along the line of sight (LOS) between the air vehicle and the target are identified. For a point in the air corresponding to the location of an air vehicle with a line of sight (LOS) to the target 18, the intersections of the LOS and precipitation forecast blocks 20 are calculated and the intersection with each precipitation forecast block is weighted along the length of the intersection within the block 22. Then the sum of the weighted intersections is determined. If the sum is greater than a predetermined threshold 24, the target is considered to be obscured by the clouds and it is not imaged with the EO/IR sensor, and the process returns to block 18. If the sum is less than the predetermined threshold, the target is added to a clear view list 26. The clear view list identifies targets that can be imaged using EO/IR sensors. The set of points for which the process is to be performed is determined by the number of targets that are requested to be imaged. If more points are to be calculated 28 the process returns to block 18, if not, the process ends 30 and an image of the target is taken.

Figure 2:
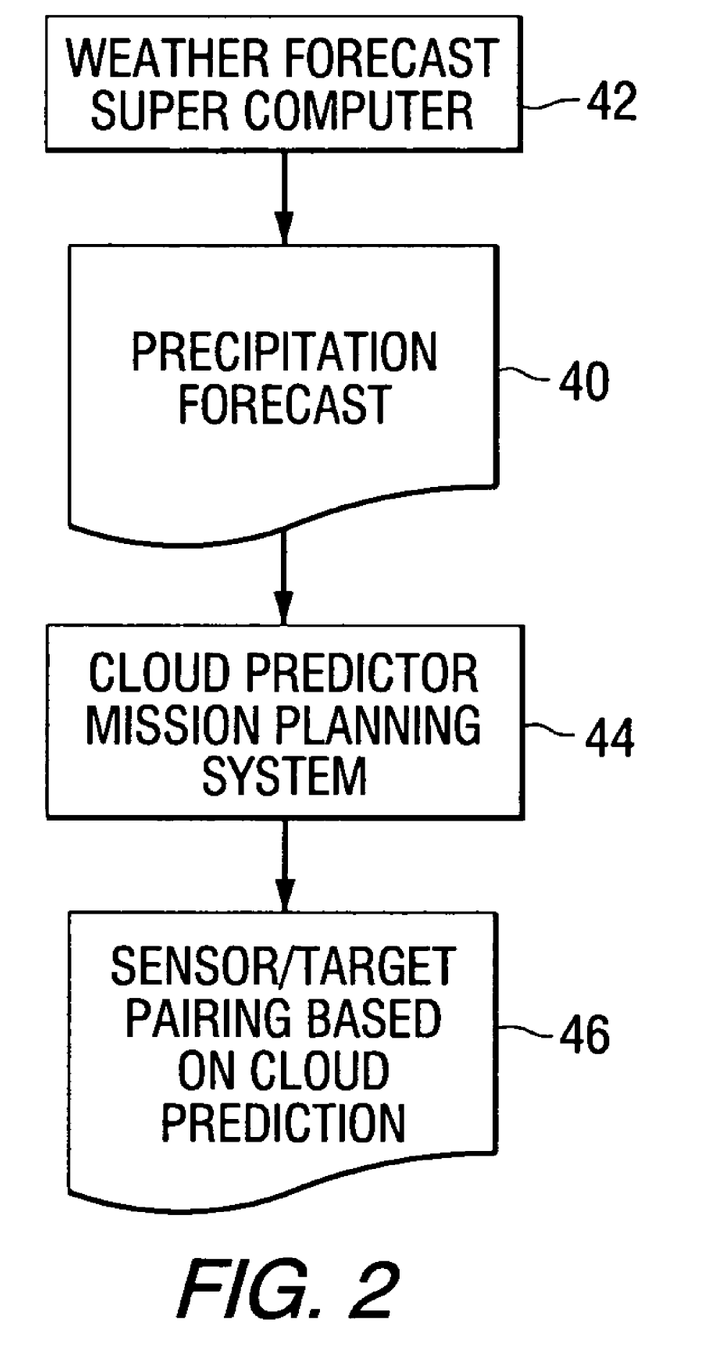
FIG. 2 is a functional block diagram of hardware used to perform the cloud obscuration prediction of FIG. 1.

FIG. 2 is a functional block diagram of hardware that can be used to perform the cloud obscuration prediction of FIG. 1. A precipitation forecast 40 is retrieved from a forecasting service that may use a supercomputer 42 to run a weather prediction model. The forecast is presented to a cloud predictor mission planning system 44, which can be a computer or other processor that is capable of performing the calculations required to implement the COPD. The cloud predictor mission planning system performs the process described in FIG. 1, and outputs a sensor/target pairing 46 based on the cloud prediction. The sensor target pairing specifies the sensor type to be used to image a target.

Figure 3:
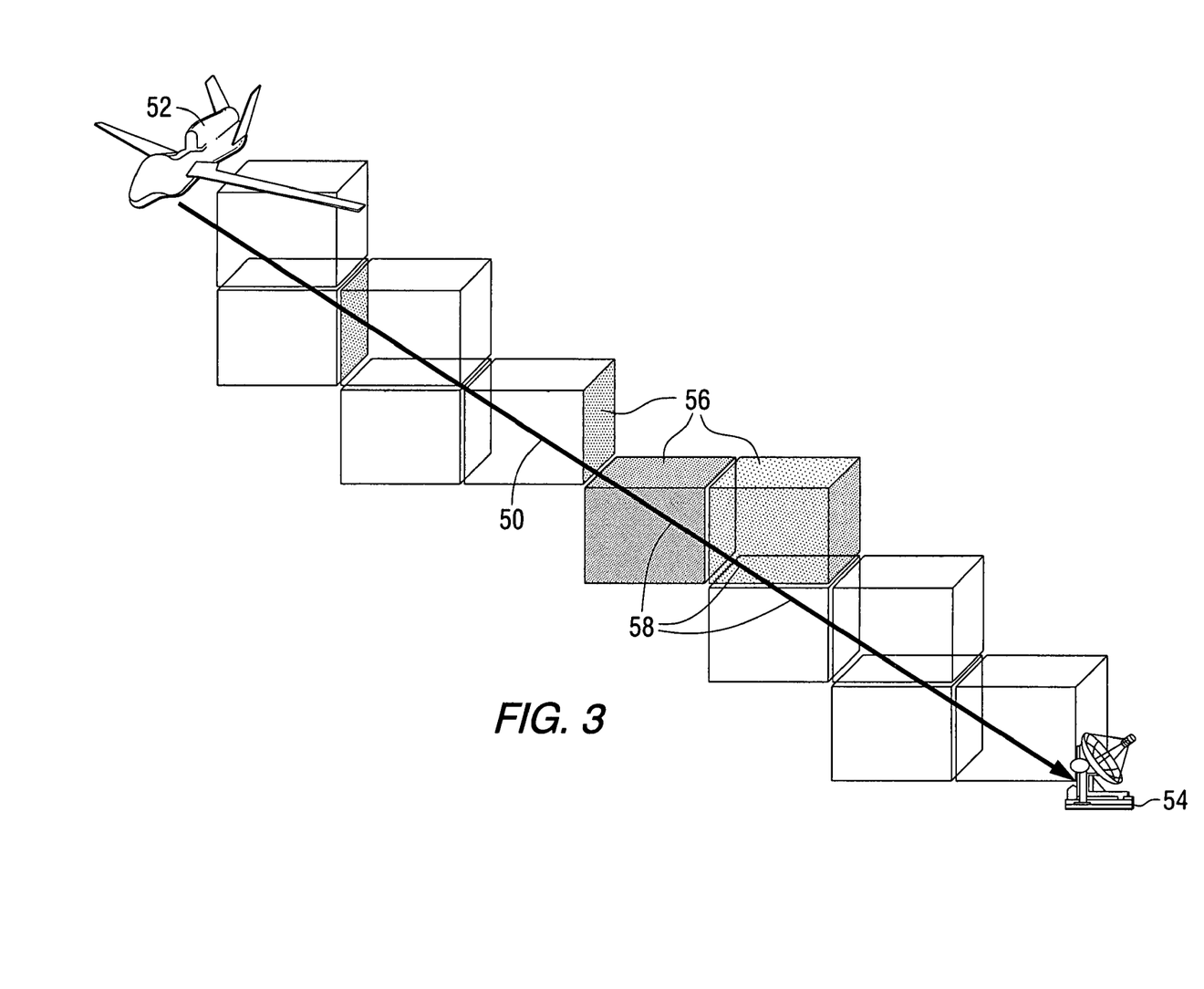
FIG. 3 is a schematic representation of a system that can perform the method illustrated in FIG. 1.

FIG. 3 is a schematic representation of a system that can operate in accordance with the method illustrated in FIG. 1. A line of sight 50 is established between a surveillance aircraft 52 and a target 54. From the precipitation forecast information, blocks 56 of forecast precipitation are identified that lie along the line of sight. The blocks are supplied by a weather agency (for example, NOAA, METCAST, or AFWA). The block information is provided in a format called a GRIBB for Gridded Binary Block. The blocks may be updated periodically, for example every 12, 6 or 1 hour. The data content of the forecast is specified by the user requesting information from the weather service. In this case, the forecast precipitation for the future time when the aircraft will be over the target area is requested.

Intersections 58 are determined where the line of sight passes through each block of forecast precipitation. The intersections are sections of the line of sight that lie within the blocks of forecast precipitation. The intersection in each block is weighted according to its length and the amount of precipitation forecast for the block that is intersected. The intersection is the length of the geometric intersection of the vector of the line of sight with the block. Opaqueness of precipitation varies with temperature and altitude along with the distance of the line of sight through the precipitation. Therefore the intersection can be weighted by the amount of precipitation predicted for the block, as well as by the altitude of the block and by the temperature of the block using an algorithm that predicts the opaqueness of the precipitation. The weighting factor for the amount of obscuration for a block can be a non-linear function where low probability precipitation is weighted less than the higher probability. The weighted intersections are summed and the summed value is compared with a threshold. If the sum is greater than the threshold, then the target is deemed to be obscured by clouds and a visual image of the target is not attempted.

The precipitation forecast predicts the amount of moisture that will be present in the atmosphere of a block. As the amount of precipitation increases a cloud will form. If the LOS intercepts a block with a cloud in it, then the LOS will be occluded and the value assigned by the function will be set at the maximum. This cloud threshold can be a predetermined value determined from previous missions. If the LOS intercepts a block with less than the amount of precipitation needed to form a cloud, then a value is set that is representative of a partial amount of obscuration. This is done to account for the fact that once obscured the whole LOS is obscured. The summation process is done to account for the incremental degradation of the LOS as each additional block further contributes to the total obscuration. The obscuration is then normalized to provide a value between 0 and 1 to present a metric of predicted obscuration that may be used by either a remote operator for choosing a sensor or by an auto routing process to route the sensor to locations that have the least predicted obscuration due to precipitation.

The obscuration probability is integrated along the LOS to come up with a total amount of cloud obscuration along the LOS. Cloud obscuration is expressed as a number from 0 to 1, where 0 means that no clouds are possible and 1 indicates a definite cloud. Values between 0 and 1 represent the probability of cloud obscuration. The total probability is then compared with a threshold to provide a go/no go signal to the remote sensor operator or to the sensor management unit on board the air vehicle. The go/no go signal is then used to cue the usage of a cloud-penetrating sensor such as the Synthetic Aperture Radar (SAR).

In an alternative embodiment, clouds may be detected by measuring the round trip time for receiving a reflection of a laser beam aimed at the target along the line of sight (LOS). For the purposes of this description, the round trip time is the time between firing an incident laser beam at a target and receiving a reflection of the incident beam. If the round trip time is less than the round trip time for the known distance to the target, then the LOS to the target is determined to be obscured, most likely by a cloud. The known distance can be determined using the distance between the location and elevation of the target and the planned location and altitude of the air vehicle (sensor platform).

Figure 4:
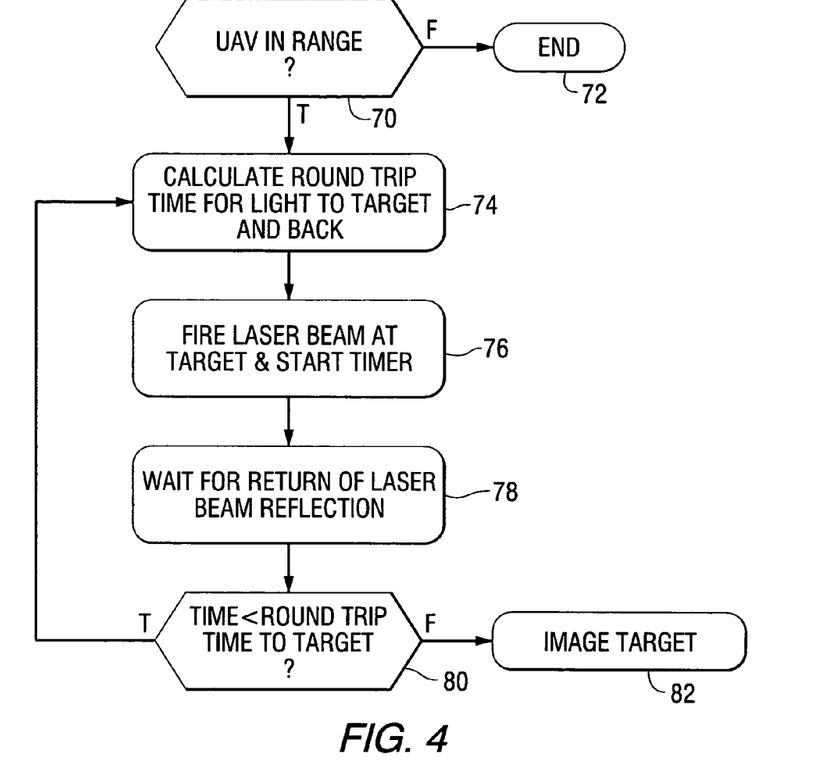
FIG. 4 is a flow diagram of cloud obscuration detection using laser detection.

FIG. 4 is a flow diagram of cloud obscuration detection using laser detection. First the method determines if the unmanned air vehicle (UAV) is in range of a target 70. If not, the process stops 72, if so, an expected round trip time for a laser light to reach the target and return is calculated 74. Then a laser beam is fired at the target 76 and a reflection of the laser beam is detected 78. Next the round trip time is compared to the expected round trip time to the target 80. If the measured round trip time is less than the expected round trip time, then the laser beam must have been reflected by something above the target, and the process returns to block 74. If the measured round trip time is equal to the expected round trip time, then the target must have reflected the laser beam, and the target can be imaged 82.

Figure 5:
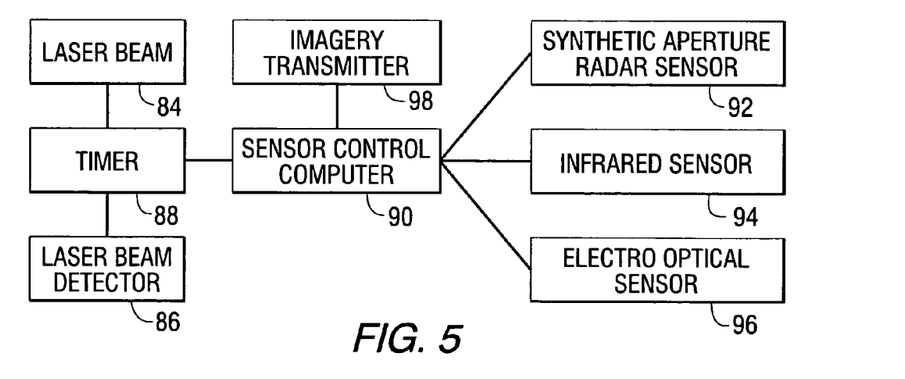
FIG. 5 is a functional block diagram of hardware used to perform the cloud obscuration detection of FIG. 4.

FIG. 5 is a functional block diagram of hardware used to perform the cloud obscuration detection of FIG. 4. A laser 84 is provided to produce the laser beam and a detector 86 is provided to detect the reflected laser beam. A timer 88 measures the time between firing of the laser and detection of the return beam. The measured time is delivered to a sensor control computer 90, which compares the measured round trip time with the expected round trip time and selects among a plurality of sensors including a synthetic aperture radar 92, an infrared sensor 94 and an electro-optical sensor 96. The selected sensor images the target and the sensor computer passes the image to a transmitter 98 that transmits the image to a user.

Figure 6:
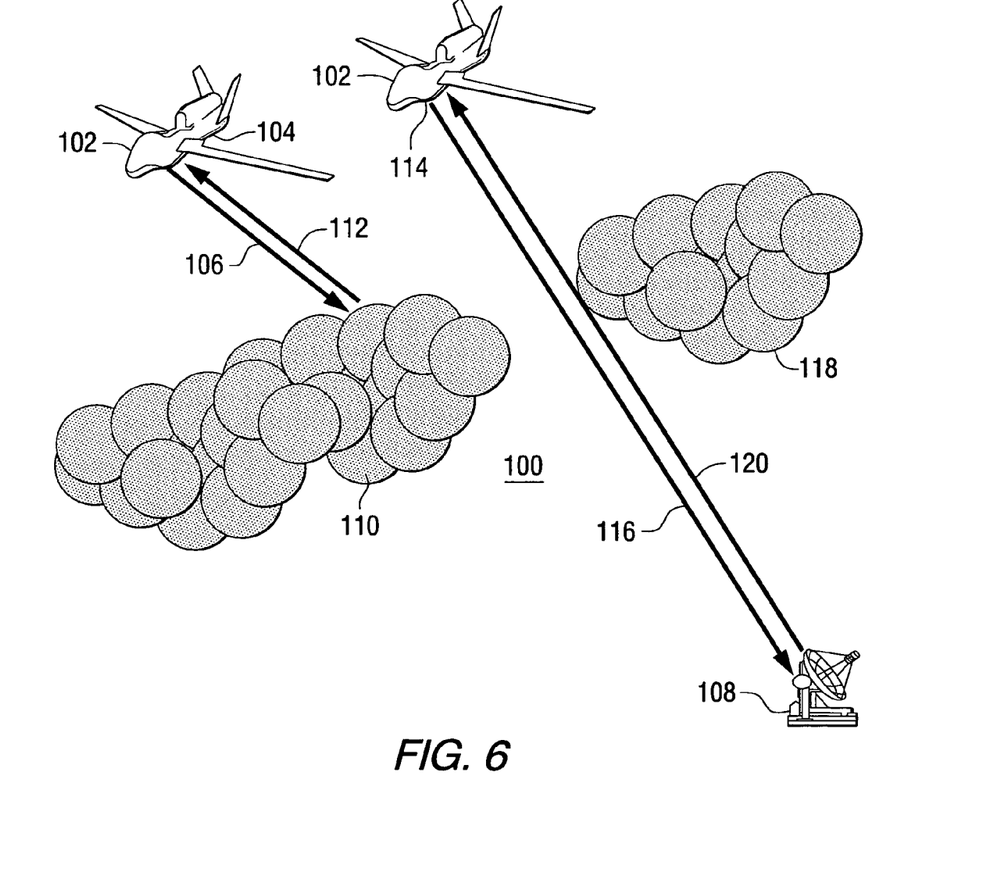
FIG. 6 is a schematic representation of a system that can perform the method illustrated in FIG. 4.

FIG. 6 is a schematic representation of a system 100 that can perform the method illustrated in FIG. 4. A surveillance aircraft 102 is shown in two positions. In position 104, a laser beam 106 is fired at a target 108, but is reflected by clouds 110. As a result, the reflected beam 112 returns to the aircraft in less time that the expected round trip time to the target. In this case the computer would select the synthetic aperture radar to produce an image of the target. In position 114, a laser beam 116 is fired at a target 108, and passes beside clouds 118. As a result, the laser beam reaches the target and the reflected beam 120 returns to the aircraft in the expected round trip time to the target. In this case, the computer would select the infrared sensor or the electro-optical sensor to produce an image of the target.

Alternatively, cloud detection can be performed by the measurement of edges in an image. This method requires the image from the EO or IR sensor to be immediately processed onboard the air vehicle. The image processing performs edge detection and edge counting to determine if the image is a picture of clouds or of the ground. Cloud detection is performed by measuring the relative movement of the clouds with respect to the air vehicle and objects at ground level.

Clouds that are between a moving sensor and a target are detectable by analysis in real time of at least two frames of target imagery that are captured close in time. The video sensor must either pan to keep the target centered by calculation of where the target should be using geographic coordinates, or the process must shift one frame so that the target is co-located in both frames. Then one frame is subtracted from the other with the result being that all objects on the ground cancel out. However since the sensor platform is moving in one image the clouds will be offset with respect to the clouds in the other image. This relative offset of the cloud position is detectable, as the frame difference image will contain the edges of the clouds or smears around the clouds. The edges may then be totaled up to rapidly determine if the cloud is large or small. In the event that the cloud covers the complete field of view for both frames, then edges from a single frame must be used to determine if there is any image of interest in the target area.

The cloud edges in this context refer to the image processing definition of edges. An edge is defined as a swift transition from a light pixel to an adjacent dark pixel or the reverse. If the transition is large, such as from light to dark is great, then the edge is identified as a heavy edge. If the transition is small, such as a dark gray pixel next to a less dark gray pixel, then the edge is a light edge. Edges in an image are calculated by convolving an edge kernel with the image. This is an automated image processing method for calculating the edges in the image. The convolution is then compared to a threshold to set the value of the edges to 0 if below the threshold value or 1 if it is above the threshold value. The number of 1's in the edge image are then totaled to determine the number of edges in the image.

Figure 7:
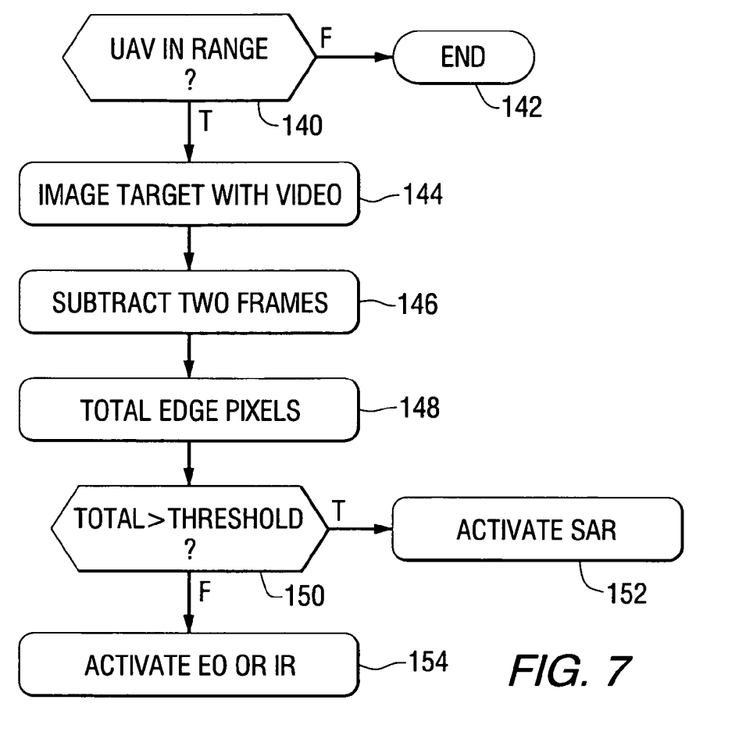
FIG. 7 is a flow diagram of cloud obscuration detection using video information.

FIG. 7 is a flow diagram of cloud obscuration detection using video information. First the method determines if the UAV is in range 140. If not, the process stops 142, if so, two video images of the target are taken 144 as the aircraft moves with respect to the target. One of the resulting two video frames is subtracted from the other 146 and the edge pixels in the difference image are determined 148. Then the total number of edge pixels is compared to a predetermined threshold 150. If the total number of edge pixels exceeds the predetermined threshold the target is imaged using a synthetic aperture radar 152. If the total number of edge pixels is less than the predetermined threshold the target is imaged using an infrared sensor or an electro-optical sensor 154.

By keeping the sensor aimed at the target, the objects between the sensor and the target will have an apparent motion because the sensor platform is moving. By detecting this apparent motion through the difference of two frames separated in time, the clouds will be seen in different positions in the image frame, but the target will be in the same position. When the frames are subtracted from each other, the difference frame will only include the moving objects, i.e. the clouds with the apparent relative motion. If the image is cloud free, then the difference frame will have no differences, i.e. a blank difference.

Figure 8:
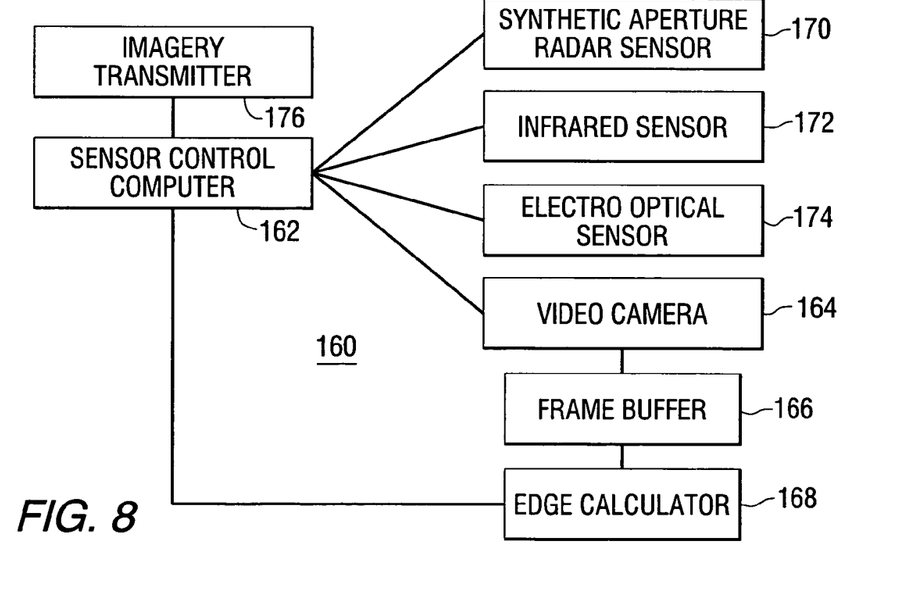
FIG. 8 is a functional block diagram of hardware used to perform the cloud obscuration detection of FIG. 7.

FIG. 8 is a functional block diagram of hardware 160 used to perform the cloud obscuration detection of FIG. 7. A sensor computer 162 is used to control a video camera 164. The video camera produces two images that are stored in a frame buffer 166 and processed by an edge calculator 168. The edge calculator determines the total number of edges, and this total number is passed to the sensor computer. The computer compares the total number of edges with the predetermine threshold and selects among a plurality of sensors including a synthetic aperture radar 170, an infrared sensor 172 and an electro-optical sensor 174. The selected sensor images the target and the sensor computer passes the image to a transmitter 176 that transmits the image to a user.

Figure 9:
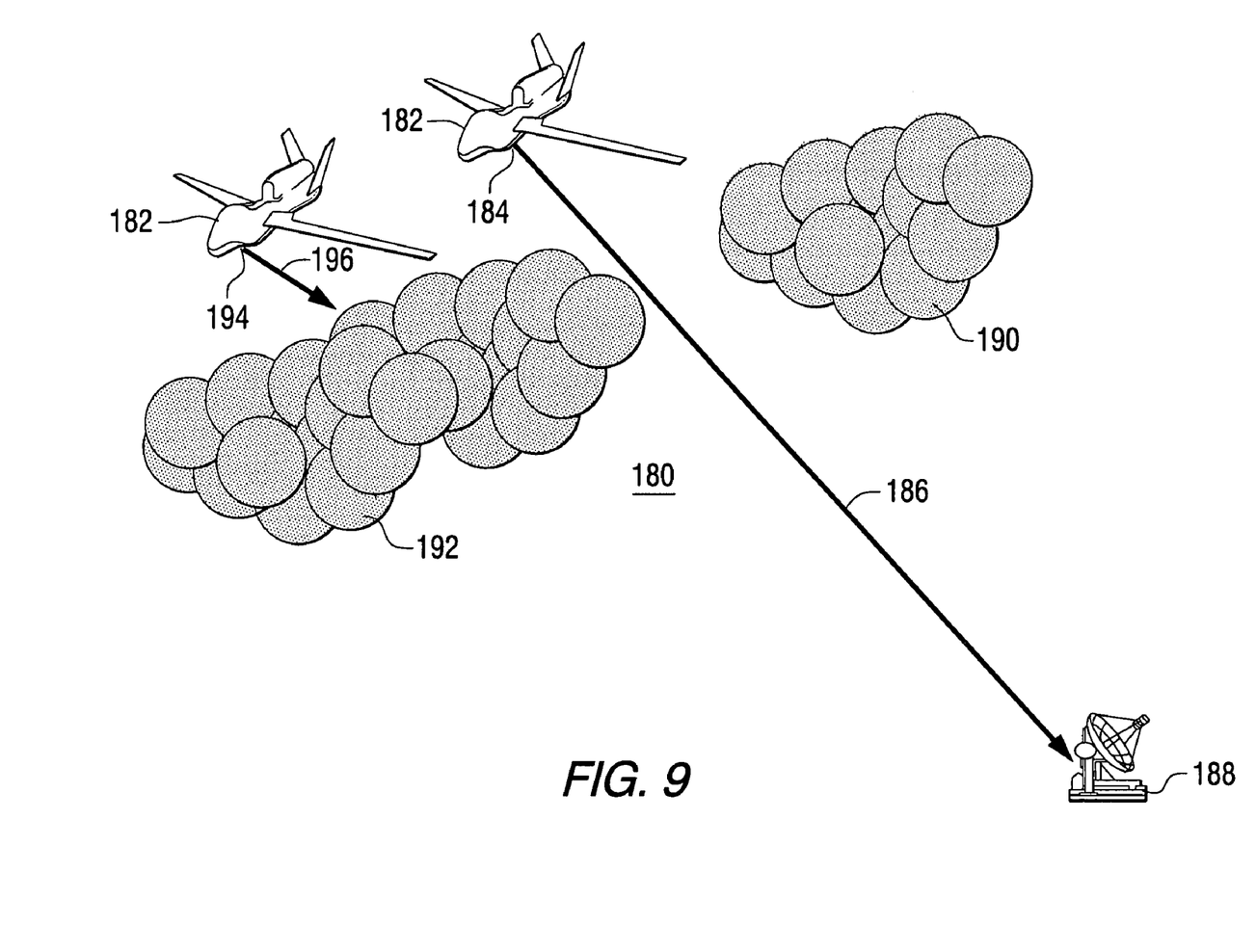
FIG. 9 is a schematic representation of a system that can perform the method illustrated in FIG. 7.

In a flying sensor platform, the limited resource is the communications bandwidth. By taking images of a target from multiple positions, image processing techniques may be used to figure out if an image in a series is of high enough quality to send over the limited bandwidth or if a cloud penetrating sensor should be used instead. FIG. 9 is a schematic representation of a system 180 that can perform the method illustrated in FIG. 7. A surveillance aircraft 182 is shown in two positions. In position 184, the line of sight 186 to a target 188 is clear but between clouds 190 and 192. The video can be used to capture an image of the target when the aircraft in position 184. In position 194, clouds 192 block the line of sight 196. Thus a video image captured by the camera would be of clouds 192. The video image taken at position 194 is subtracted from the video image taken at position 184. The computer compares the total number of edges with the predetermine threshold and selects among a plurality of sensors including a synthetic aperture radar, an infrared sensor and an electro-optical sensor.

Clouds that are between a sensor platform and a more distant target are detectable by illuminating a target with a laser beam that is not in the same position on the air vehicle as the sensor. As an example the sensor may be toward the front of an aircraft and the laser may be toward the tail. The laser beam is directed toward the target area. As the video sensor images the target, the laser beam will be offset from the centerline of the sensor or it may not even be in the image frame. However if the laser beam is seen in the image frame, then its distance from frame center can be calculated to determine the presence of a cloud and optionally the range of that cloud. The range to the target is known via a global positioning system (GPS) position of the sensor platform and the known location of the target. By comparing the range to the obscuration via the offset of the laser, it can be determined that the target is obscured by on object such as a cloud. The distance between the location of the sensor and the location of the laser on the aircraft causes the sensor center and the laser to be in different positions. As the distance between the air vehicle and the target increases, the distance between the laser spot and the center of the image varies. This distance can be calculated using the geometry of the simple triangle formed.

Figure 10:
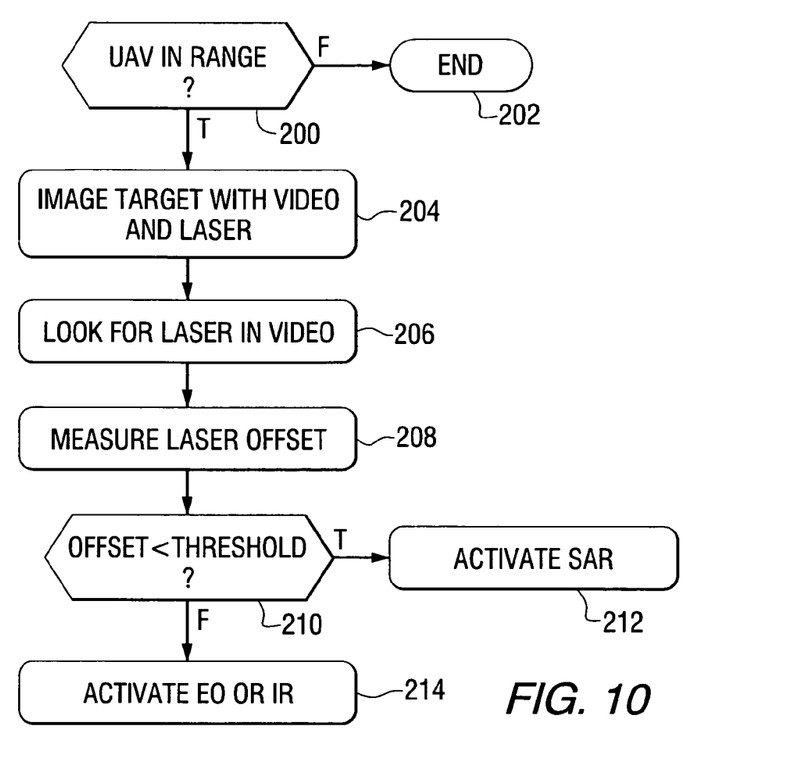
FIG. 10 is a flow diagram of cloud obscuration detection using a combination of video and laser information.

FIG. 10 is a flow diagram of cloud obscuration detection using a combination of video and laser information. First the method determines if the UAV is in range 200. If not, the process stops 202, if so, the target is imaged using both a video camera and a laser 204. The position of the laser in the video is determined 206 and the offset of the laser is measured 208. The offset is the distance in pixels from the center of the image. Next the offset is compared to a threshold 210. If the offset is less than the threshold, then a synthetic aperture radar is activated 212. If the offset is greater than or equal to the threshold, then the electro-optical or infrared sensor can be activated 214.

Figure 11:
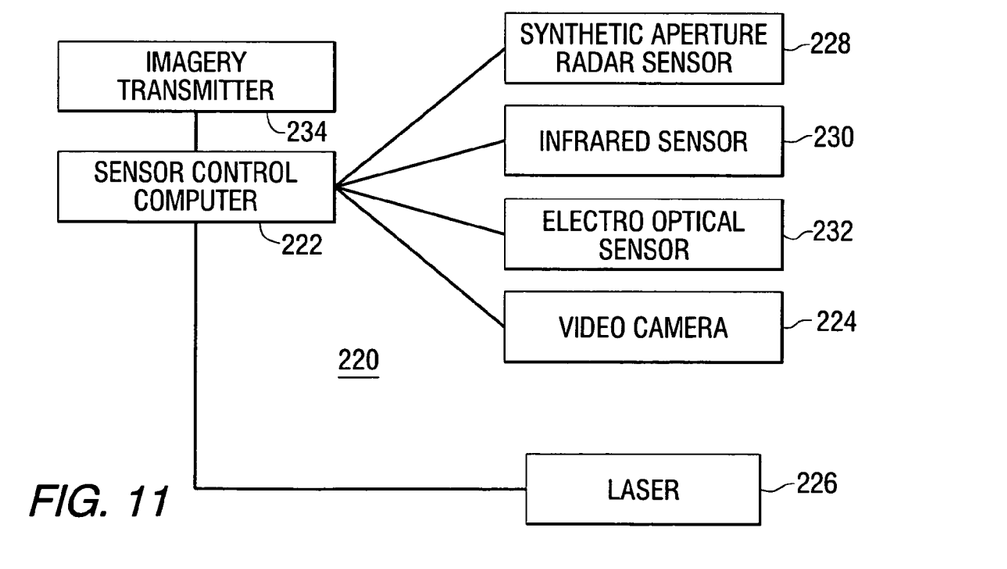
FIG. 11 is a functional block diagram of hardware used to perform the cloud obscuration detection of FIG. 10.

FIG. 11 is a functional block diagram of hardware 220 used to perform the cloud obscuration detection of FIG. 10. A sensor computer 222 is used to control a video camera 224 and a laser 226. The video camera produces an image of the target, and the image includes a beam from the laser. The computer measures the offset of the laser beam and selects among a plurality of sensors including a synthetic aperture radar 228, an infrared sensor 230 and an electro-optical sensor 232. The selected sensor images the target and the sensor computer passes the image to a transmitter 234 that transmits the image to a user.

Figure 12:
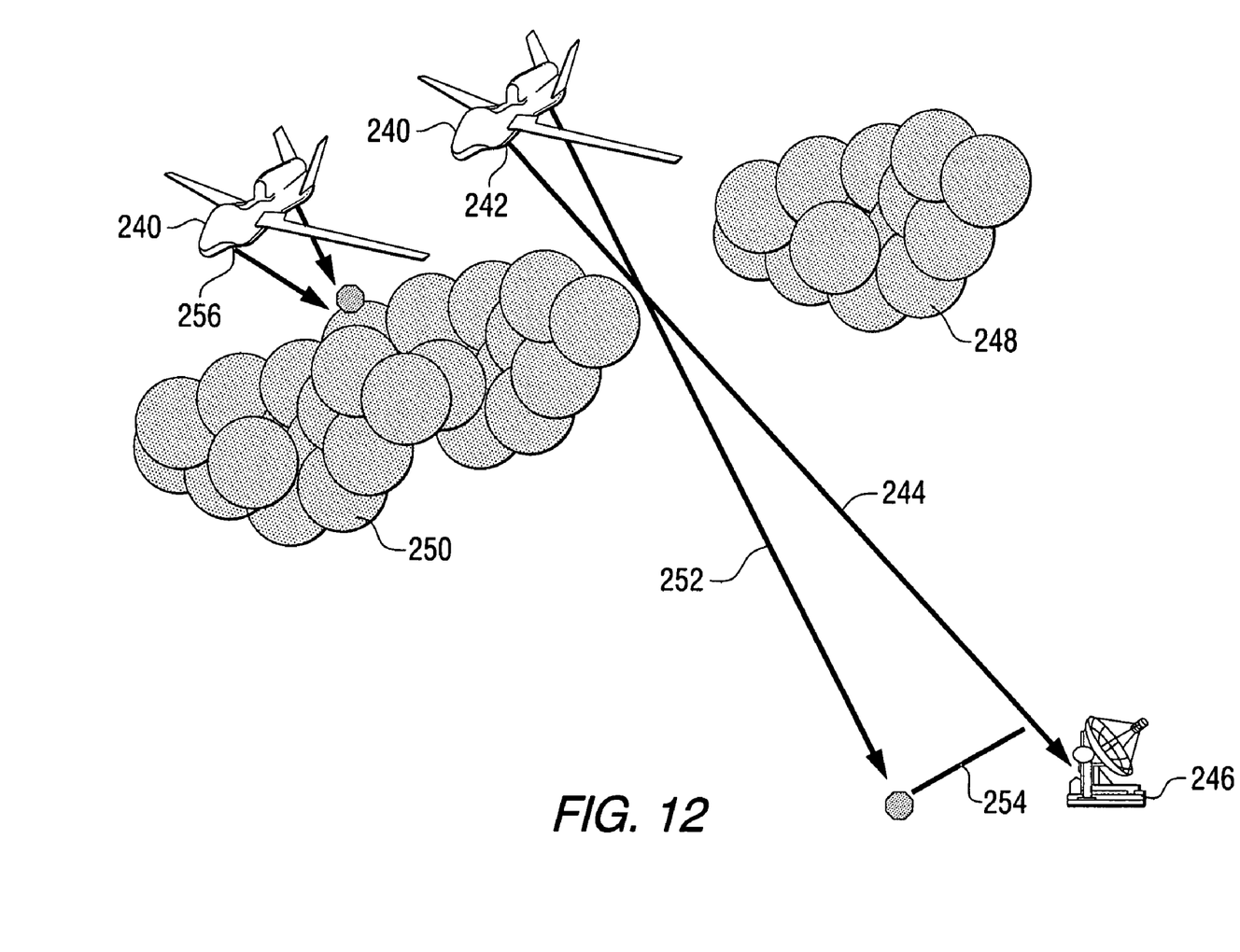
FIG. 12 is a schematic representation of a system that can perform the method illustrated in FIG. 10.

FIG. 12 is a schematic representation of a system that can perform the method illustrated in FIG. 10. A surveillance aircraft 240 is shown in two positions. In position 242, a the line of sight 244 to a target 246 is clear but between clouds 248 and 250. The video sensor can be used to capture an image of the target when the aircraft in position 242 and a laser beam 252 is projected toward the target. A large offset 254 occurs between the target and the laser beam in the video image. In position 256, clouds 250 block the line of sight. Thus a video image captured by the camera would be of clouds 250, and the laser beam offset would be small.

Laser reflection can be measured using a photo detector that is notch filtered to receive only the frequency of the laser being used to illuminate the target. Cloud detection can be performed by measuring the amount of reflected light from a laser designator. To measure reflected light, a laser is used to project a beam from the air vehicle to the target and a detector on the air vehicle measures the amount of light reflected back.

The combination of the cloud prediction and the three means of cloud detection described above provide for a robust means to avoid cloud shots during reconnaissance missions. While the invention has been described in terms of several embodiments, it will be apparent to those skilled in the art that various changes can be made to the disclosed embodiments without departing from the scope of the invention as set forth in the following claims.

What is claimed is:

1. A method of imaging targets using an unmanned air vehicle, the method comprising the steps of:
    making a determination of cloud obscuration of a target;
    selecting an imaging sensor based on the cloud obscuration determination; and
    using the selected imaging sensor to produce an image of the target;
    wherein the step of making a determination of cloud obscuration of a target comprises the steps of:
        firing a laser beam toward an area of interest;
        measuring a time for a reflected beam to return to a sensor; and
        comparing the measured time to an expected time.

2. The method of claim 1, wherein the step of making a determination of cloud obscuration of a target further comprises the step of:
    detecting clouds based on image content.

3. The method of claim 1, wherein the step of making a determination of cloud obscuration of a target further comprises the steps of:
    taking an image of the target in the area of interest; and
    determining an offset between the laser beam and the target in the image.

4. A method of imaging targets using an unmanned air vehicle, the method comprising the steps of:
    making a determination of cloud obscuration of a target;
    selecting an imaging sensor based on the cloud obscuration determination; and
    using the selected imaging sensor to produce an image of the target;
    the step of detecting clouds based on image content comprises the steps of:
        taking an image of an area of interest;
        identifying cloud edges in the image of the area of interest;
        summing the number of cloud edges; and
        comparing the total number of cloud edges to a predetermined number.

5. The method of claim 4, wherein the step of identifying cloud edges comprises the step of:
    comparing relative velocities of at least two of the edges.

6. The method of claim 4, wherein the step of making a determination of cloud obscuration of a target further comprises the step of:
    detecting clouds based on the relative movement of the clouds.

7. An apparatus for imaging targets from an air vehicle, the apparatus comprising:
    a sensing system for determining cloud obscuration of a target;
    a processor for using forecasts of precipitation in an area of interest to determine a probability of cloud obscuration along a line of sight between the air vehicle position and a target;
    at least two different imaging sensors; and
    a controller for selecting one of the target sensors for imaging the target, based on the determined cloud obscuration;
    wherein the sensing system comprises:
        a laser for producing a beam of light capable of being reflected by clouds; and
        a processor for measuring a time for a reflected beam to return to a sensor and for comparing the measured time to an expected time.

8. An apparatus for imaging targets from an air vehicle, the apparatus comprising:
    a sensing system for determining cloud obscuration of a target;
    a processor for using forecasts of precipitation in an area of interest to determine a probability of cloud obscuration along a line of sight between the air vehicle position and a target;
    at least two different imaging sensors; and
    a controller for selecting one of the target sensors for imaging the target, based on the determined cloud obscuration;
    wherein the sensing system comprises:

a camera for producing images of an area of interest; and a processor for identifying cloud edges in the images, for summing the cloud edges, and for comparing the total number of cloud edges to a predetermined number.

9. The apparatus of claim 8, wherein the processor identifies cloud edges by comparing relative velocities of at least two of the edges in different image frames.

10. The apparatus of claim 8, wherein the sensing system detects clouds based on the relative movement of the clouds.

11. The apparatus of claim 8, wherein the sensing system further comprises:

a laser for shining a laser beam toward the area of interest; and the processor measures an offset between the laser beam and the target, and compares the measured offset to a predetermined offset.

* * * * *